(12) United States Patent
Poger et al.

(10) Patent No.: US 6,772,420 B1
(45) Date of Patent: Aug. 3, 2004

(54) USING LINK-LAYER ADDRESS TO OBTAIN DEVICE DRIVERS

(75) Inventors: Elliot Poger, San Franciso, CA (US); Freeman Murray, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/426,748

(22) Filed: Oct. 26, 1999

(51) Int. Cl.[7] .................................................. G06F 3/00
(52) U.S. Cl. ........................ 719/327; 719/321; 709/220; 709/221
(58) Field of Search .......................... 717/168, 172–178, 717/8; 709/321–327, 221, 220; 719/321, 327

(56) References Cited

U.S. PATENT DOCUMENTS

| | | | | |
|---|---|---|---|---|
| 5,559,965 A | * | 9/1996 | Oztaskin et al. ............ | 710/104 |
| 5,655,148 A | * | 8/1997 | Richman et al. ............ | 710/8 |
| 5,787,246 A | * | 7/1998 | Lichtman et al. .......... | 709/220 |
| 6,023,585 A | * | 2/2000 | Perlman et al. ............ | 717/178 |
| 6,178,468 B1 | * | 1/2001 | Rudd ........................ | 717/175 |
| 6,301,012 B1 | * | 10/2001 | White ....................... | 358/1.15 |
| 6,330,715 B1 | * | 12/2001 | Razzaghe-Ashrafi ......... | 717/11 |
| 6,421,069 B1 | * | 7/2002 | Ludtke et al. .............. | 345/762 |

* cited by examiner

Primary Examiner—Meng-Al T. An
Assistant Examiner—Phuong Ngoc Hoang
(74) Attorney, Agent, or Firm—Finnegan, Henderson, Farabow, Garrett & Dunner, LLP

(57) ABSTRACT

Methods and systems consistent with the present invention utilize a unique hardware address of a first network device to determine and locate an appropriate driver software for controlling the network device. Once the driver software has been located, it is installed on a network server, or other network device, capable of controlling the first network device. This method operates automatically, absent user intervention, each time a new device enters a network.

13 Claims, 2 Drawing Sheets

US 6,772,420 B1

USING LINK-LAYER ADDRESS TO OBTAIN DEVICE DRIVERS

FIELD OF THE INVENTION

This invention relates generally to data processing systems and, more particularly, to a system and method that automatically retrieves and installs driver software on a network server when a device enters a network.

BACKGROUND OF THE INVENTION

Devices in a network communicate with other devices in the network to perform a variety of processing functions. The term "device" refers to a variety of system resources, including hardware devices, e.g., a magnetic disk drive device, and display devices. Network devices communicate with one another by sending packets of Internet Protocol (IP) signaling information over a physical network connection medium such as Ethernet. The data link layer of a communications network serves as a facility for transmitting this signaling information. Communication among network devices includes sending informational messages, requesting information in the form of a query, and exerting control to perform specified operations. For communication among network devices to be effective, the devices must both understand and respond to (i.e., be understood by) signals sent by other network devices. Each network device therefore includes software capable of communicating with the network and with other network devices.

The term "driver software" refers to a program that supports communication between network devices by allowing one network device to query and control another network device. For example, driver software may be loaded on a network server, enabling the server to control various hardware specific registers, larches, signals, or other components of a magnetic disk drive device coupled to a computer system. Driver software activates the transmission and receipt of data over a network. For one network device to control another network device, the first device must therefore have installed on it the driver software corresponding to the device it wishes to control. Because each network device has its own set of capabilities and communication requirements, each network device requires that specific driver software be installed on a second network device to enable the second network device to control and query it. This driver software is usually distributed with a device when it is sold, e.g., stored on a floppy disk or a CD-ROM, and manually installed on one or more network devices by a user of the network device.

Alternatively, protocols exist that support automatic configuration of certain network devices. Current automatic configuration techniques may only be used with devices including required software, or understanding a particular protocol. For example, the Jini™ technology by Sun Microsystems™ includes a suite of application programs and interfaces that ease network administration by allowing devices to register with a network, enabling access to and from other network devices, without user intervention. A Jini protocol may thus be used to automatically install driver software on network devices that include this functionality. Additional information on Jini technology may be found in "The Jini Specification," by Ken Arnold et al., Addison-Wesley (1999), incorporated herein by reference. However, Jini protocols require all involved devices to implement a new protocol, thereby increasing the overhead required for network devices to make use of such a protocol.

Accordingly, a need exists for a method of automatically installing driver software on all network devices.

SUMMARY OF THE INVENTION

In accordance with a first aspect of the present invention, as embodied and broadly described herein, a method is implemented in a data processing system for automatically installing a network device on a network by installing driver software on a network server used to operate the network device. The system receives a hardware address of a network device, determines a driver software needed to control the device, and installs the driver software on the network server.

In accordance with an embodiment of the first aspect of the present invention, as embodied and broadly described herein, an apparatus is provided that includes a first network device and a second network device, connected via a network. The first network device includes a driver installation system that observes a hardware address of the second network device and uses the hardware address to determine a type and location of driver software needed to control the second network device. The system further includes at least one processor for executing the driver installation system.

In accordance with another embodiment of the first aspect of the present invention, as embodied and broadly described herein, an apparatus is provided that includes a network server and a network device, connected via a network. The network server includes a driver installation system that observes a hardware address of the network device and uses the hardware address to determine a type and location of driver software needed to control the network device. The system further includes at least one processor for executing the driver installation system.

BRIEF DESCRIPTION OF THE DRAWINGS

The accompanying drawings, which are incorporated in and constitute a part of this specification, illustrate an implementation of this invention, and together with the description, serve to explain the advantages and principles of the invention. In the drawings.

DETAILED DESCRIPTION

Figure 1:
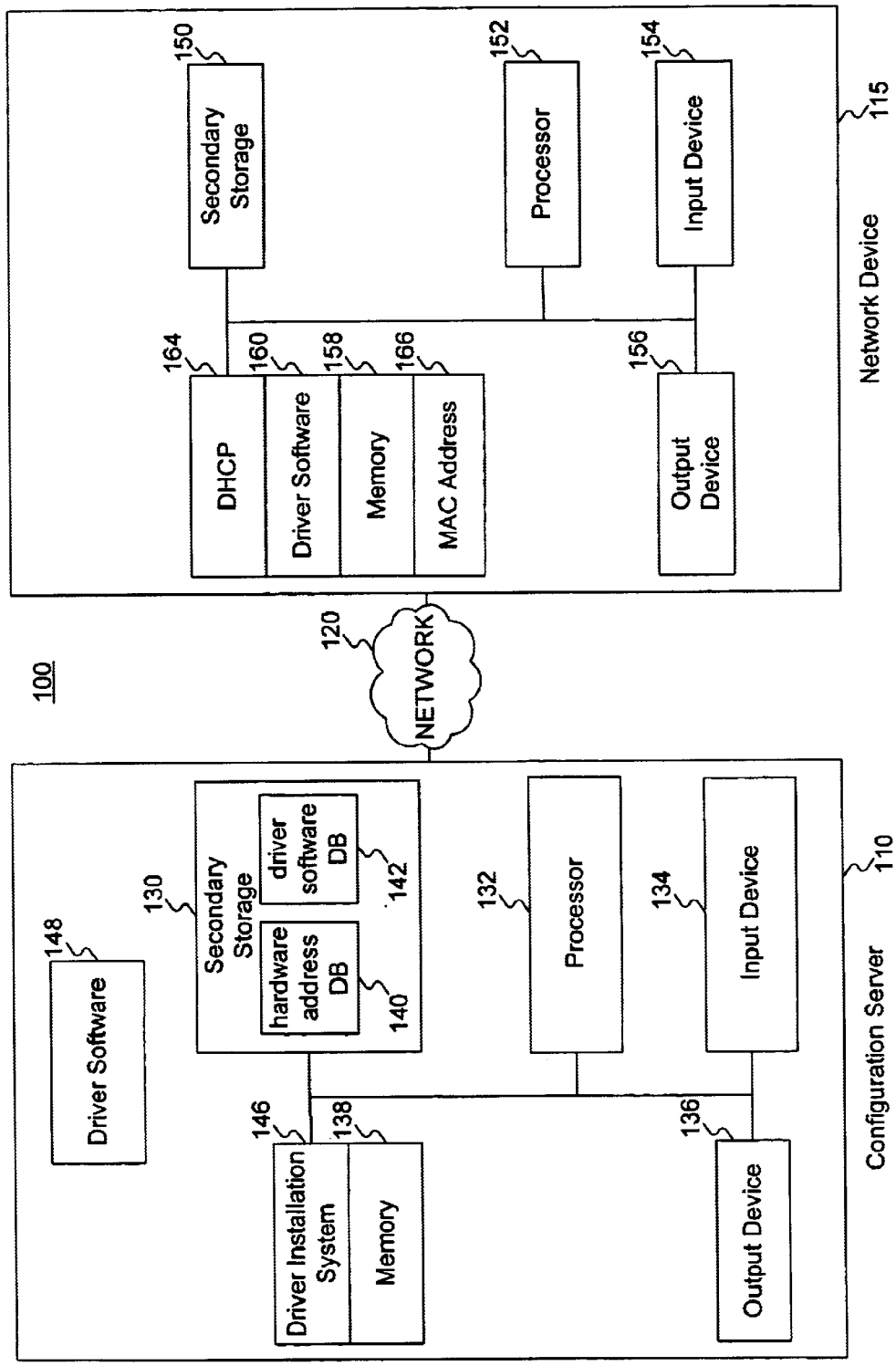
FIG. 1 is an exemplary network in which methods and systems consistent with the present invention may be implemented.

Reference will now be made in detail to an implementation consistent with the present invention as illustrated in the accompanying drawings. Wherever possible, the same reference numbers will be used throughout the drawings and the following description to refer to the same or like parts.

Introduction

Methods and systems consistent with the present invention use the link-layer hardware address of a network device to implement automatic configuration of the network device. More specifically, methods and systems consistent with the present invention implement hardware "plug-and-play" by using the link-layer hardware address to identify both the type and location of the driver software required for communicating with a network device. Once the type and location of the driver software have been determined, methods and systems consistent with the present invention retrieve and install the driver software on a network server, enabling the server to communicate with the network device. Methods and systems consistent with the present invention do not require all network devices to include additional software or implement a new protocol. In the description below, the term "driver installation system" will be used to refer to methods and systems operating in accordance with the present invention.

All network devices have a unique hardware address used to identify the device. This address is referred to as the link-layer address. The link-layer address includes a series of bits that is written into network messages in either the "sender" or the "recipient" field. A device writes its own hardware address in the "sender" field of messages it transmits; a device writes the hardware address of a device that is intended to receive a message into the "recipient" field of messages it transmits. In an Ethernet network, for example, the link-layer address of a device contains 48 bits. The link-layer address may also be referred to as a media access control (MAC) address.

The Internet Corporation for Assigned Names and Numbers (ICANN), which superseded the Internet Assigned Numbering Authority (IANA), assigns blocks of link-layer hardware addresses to manufacturers of network devices. The manufacturers then assign different link-layer addresses within their block of addresses to each device produced. To guarantee that no two devices on a network have the same link-layer address, all devices are assigned unique link-layer addresses at the time of manufacture. ICANN assigns link-layer addresses to manufacturers of network devices hierarchically, thereby allowing the manufacturer of a device to be determined based on the link-layer address of the device.

Methods and systems operating in accordance with the principles of the present invention use the link-layer address of a network device to determine the manufacturer of the device, which in turn allows identification of information reflecting the model and type of the device, and the location of the appropriate driver software for controlling the device. Once the appropriate driver software has been located, it is installed on a network server capable of operating the network device.

Implementation Details

FIG. 1 depicts an exemplary distributed network 100 suitable for practicing methods and systems consistent with the present invention. Distributed network 100 includes configuration server 110 connected to network device 115 via network 120. Configuration server 110 includes secondary storage 130, processor 132, input device 134, output device 136, and memory 138. Secondary storage 130 includes a hardware address database 140 and driver software database 142. Hardware address database 140 includes information correlating a hardware address of a device with information reflecting the manufacturer and type of the device. Driver software database 142 includes information correlating a type of device with the appropriate driver software for communicating with the device.

Driver installation system 146 operates in memory 138. Driver installation system 146 uses information stored in hardware address database 140 and driver software database 142 to identify the type and location of driver software required to communicate with a network device, and installs the driver software 148 onto configuration server 110. Once the driver software 148 has been installed on the configuration server 110, configuration server 110 may query and control the device corresponding to the driver software 148.

Network device 115 includes secondary storage 150, processor 152, input device 154, output device 156, and memory 158. Driver software 160 resides in memory 158. A dynamic host configuration protocol (DHCP) 164 also resides in memory 158. DHCP allows a network device using transmission control protocol/internet protocol (TCP/IP) to request information from a server to automatically configure itself by providing the device with a unique IP address and other network information so that the device may communicate with other devices on the network. Further information on DHCP may be found in the Request for Comments (RFC) 1541, maintained by the Internet Engineering Task Force (IETF), located at ietf.org/rfc/rfc1541.txt, incorporated herein by reference. Link-layer address 166 represents a unique media access control address assigned to each device connected to an Ethernet network.

One skilled in the art will appreciate that configuration server 110 and network device 115, although depicted with various components, may contain additional or different components. One skilled in the art will also appreciate that in this exemplary embodiment, only one network device and one network are shown, although methods and systems consistent with the present invention may function with many network devices, interconnected via many networks. Additionally, network 120 may include a wide area network, like the Internet, or a local area network, such as Ethernet. Furthermore, although aspects of the present invention are described as being stored in memory, one skilled in the art will appreciate that these aspects can also be stored on or read from other types of computer-readable media, such as secondary storage devices, like hard disks, floppy disks, a CD-ROM, or other forms of RAM or ROM. For example, hardware address database 140 and driver software database 142 may be stored on or read from other types of computer-readable media, such as hard disks, floppy disks, a CD-ROM, or other forms of RAM or ROM. Still further, one skilled in the art will appreciate that driver software 148 may be installed by the driver installation system onto a network server or other network device.

Figure 2:
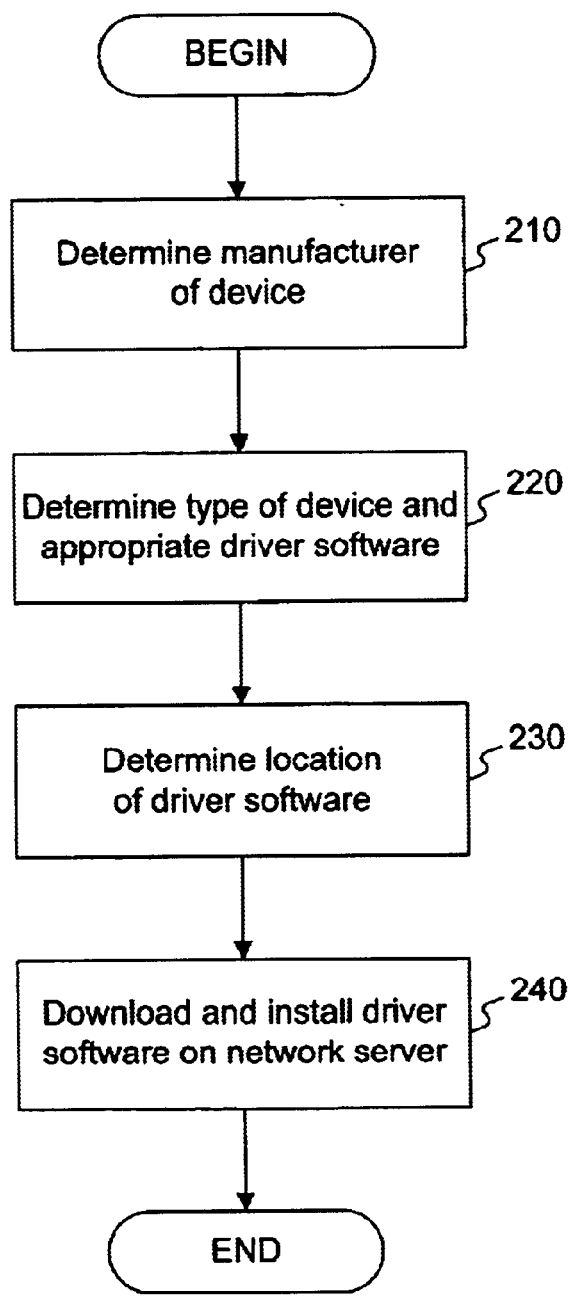
FIG. 2 is a flow chart depicting the steps performed by the driver installation system of the present invention.

FIG. 2 depicts a flowchart of the steps performed by a driver installation system operating in accordance with the principles of the present invention. Before the steps of FIG. 2 are performed, however, a device is connected to a network and configured as a network device. For example, the following steps may occur: (1) a user of a device attaches the device to a network and applies power to the device, and (2) the device uses DHCP to obtain network configuration information and automatically configures itself as a network device, thereby enabling it to be recognized by, and exchange information with other network devices.

DHCP messages include a unique hardware address, or a device link-layer address. As is discussed above, the link-layer address includes a sequence of numbers that are assigned to manufacturers in blocks. This portion of the link-layer address is referred to as "device type information". The manufacturer of a device may therefore be determined by examining the device type information portion of a link-layer address included in a DHCP message.

After a device has been configured, a network server observes the device type information and uses it to determine the manufacturer of the device (step 210). To determine the manufacturer of a device, the driver installation system accesses a table that maintains a list of manufacturers and the link-layer addresses assigned to each. The driver installation system then determines the manufacturer of a device by determining a range within which a particular device type information entry falls, and matching the result with the manufacturer assigned to that range of numbers. This list may be stored local to the server or at a remote location.

Once the manufacturer of a device has been determined, the driver installation system reads the rest of the link-layer address to determine the particular model and version of the device, and the driver software required to control and query the device (step 220). To determine the type of device, the driver installation system accesses a table containing a list of manufacturers and associated information on the type of devices manufactured by each manufacturer. Generally, a manufacturer hierarchically assigns link-layer addresses to devices, thereby simplifying the process of determining a type of a device based on its link-layer address. If, however, link-layer addresses are not assigned hierarchically, or in some other methodical manner, the driver installation system may perform a simple matching operation to determine the type of device based on the link-layer address. The table used to determine the type and version of a device based on the link-layer address of the device may be stored local to a server containing the driver installation system server, or at a remote location, e.g., on another network server that may be maintained by the manufacturer.

The table containing information listing the type of device and the driver software required to query and control the device includes a list of uniform resource locators (URLs) indicating where the driver software is stored. After determining the type of the device and the driver software required to query and control it, the driver installation system determines the location of the driver software (step 230).

Next, after determining the location of the driver software, the driver installation system accesses the specified location, downloads the driver software, and installs it on a network server (step 240). Once the driver software for a particular device has been installed on a network server, other network devices may interact with that device by interacting with the network server containing the driver software needed for controlling and querying the particular device.

Conclusion

By using the link-layer address of a network device to determine the type and location of the driver software required to query and control the device, methods and systems consistent with the present invention automate the process of installing a network device on a network by installing an appropriate driver software on a network server when the network device is added to a network. The process described above occurs automatically each time a new device enters a network, and does not require a request from a network device or user to install the driver software on a network server. Further, methods and systems consistent with the present invention do not require any additional intelligence in network devices.

Although methods and systems consistent with the present invention have been described with reference to an embodiment thereof, those skilled in the art will know of various changes in form and detail which may be made without departing from the spirit and scope of the invention. For example, the driver installation system may operate on one network server, or alternatively, among several network servers. Additionally, information accessed by the driver installation system may be stored local to a particular server, or remotely, for example, on a floppy disk. Furthermore, driver software necessary for controlling a network device may be installed on another network device, i.e., a device other than a network server. This invention is limited only by the appended claims and the full scope of their equivalents.

What is claimed is:

1. An automated method in a data processing system for determining an appropriate driver software for a network device, comprising:

receiving a hardware address of a first network device;

examining a portion of the hardware address;

ascertaining a manufacturer of the first network device by accessing a table that stores a list of manufacturers and link-layer addresses assigned to each, determining a range of numbers in the list within which the portion of the hardware address falls, and matching the range with a corresponding manufacturer;

obtaining a first network device type based on the hardware address and the manufacturer of the first network device; and determining an appropriate driver software for controlling the first network device based on the first network device type.

2. The automated method of claim 1, wherein the step of receiving includes receiving a media access control address of the first network device.

3. The automated method of claim 1, wherein the step of receiving includes extracting a portion of a dynamic host configuration protocol address.

4. The automated method of claim 1, wherein the step of receiving includes receiving a link-layer address of the first network device.

5. The automated method of claim 1, further including the step of determining a storage location of the driver software.

6. The automated method of claim 5, further including the step of downloading the driver software from a remote location.

7. A data processing system, comprising:

at least one storage device including a hardware address associated with a network device and driver software for controlling and querying the network device;

a memory containing a program with code that: observes the hardware address; examines a portion of the hardware address; ascertains a manufacturer of the network device by accessing a table that stores a list of manufacturers and link-layer addresses assigned to each, determining a range of numbers in the list within which the portion of the hardware address falls, and matching the range with a corresponding manufacturer; obtains a network device type based on the hardware address and the manufacturer of the device; and determines an appropriate driver software for controlling the network device based on the network device type; and a processor for running the program.

8. A system for determining an appropriate driver software for a network device on a network, comprising:

a network server connected via a network to the network device and including a driver installation system that: observes a hardware address of a network device; examines a portion of the hardware address; ascertains a manufacturer of the network device by accessing a table that stores a list of manufacturers and link-layer addresses assigned to each, determining a range of numbers in the list within which the portion of the hardware address falls, and matching the range with a corresponding manufacturer; obtains a network device type based on the hardware address and the manufacturer of the device; and determines an appropriate driver software for controlling the network device based on the network device type; and at least one processor for executing the driver installation system.

9. The system of claim 8 wherein the network server observes a link-layer address of the network device.

10. The system of claim 8 wherein the network server uses a link-layer address of the network device to determine a type and location of driver software needed to control the network device.

11. A computer-readable medium containing instructions for controlling a data processing system to perform a method, the method comprising the steps of:

receiving a hardware address of a first network device;

examining a portion of the hardware address;

ascertaining a manufacturer of the first network device by accessing a table that stores a list of manufacturers and link-layer addresses assigned to each, determining a range of numbers in the list within which the portion of the hardware address falls, and matching the range with a corresponding manufacturer;

obtaining a first network device type based on the hardware address and the manufacturer of the first network device; and determining an appropriate driver software for controlling the first network device based on the first network device type.

12. The computer-readable medium of claim 11 wherein the step of receiving includes receiving a media access control address of the network device.

13. An apparatus for installing determining an appropriate driver software for a network device, comprising:

means for receiving a hardware address of a first network device;

means for examining a portion of the hardware address;

means for ascertaining a manufacturer of the first network device by accessing a table that stores a list of manufacturers and link-layer addresses assigned to each, determining a range of numbers in the list within which the portion of the hardware address falls, and matching the range with a corresponding manufacturer;

means for obtaining a first network device type based on the hardware address and the manufacturer of the first network device; and means for determining an appropriate driver software for controlling the first network device based on the first network device type.

* * * * *

UNITED STATES PATENT AND TRADEMARK OFFICE
CERTIFICATE OF CORRECTION

PATENT NO. : 6,772,420 B1  
DATED : August 3, 2004  
INVENTOR(S) : Elliot Poger et al.

It is certified that error appears in the above-identified patent and that said Letters Patent is hereby corrected as shown below:

<u>Title page,</u>  
Item [54], Title, delete the title in its entirety and insert therefor  
-- SYSTEM FOR OBTAINING APPROPRIATE DEVICE DRIVERS BY ACCESSING TABLE HAVING LIST OF MANUFACTURERS AND LINK-LAYER ADDRESSES ASSIGNED TO DEVICE DRIVERS --.  
Item [75], Inventors, "San Franciso," should read -- San Francisco, --.

<u>Column 8,</u>  
Line 4, delete "installing".

Signed and Sealed this

Fifth Day of October, 2004

JON W. DUDAS  
*Director of the United States Patent and Trademark Office*